United States Patent Office 3,550,319
Patented Dec. 29, 1970

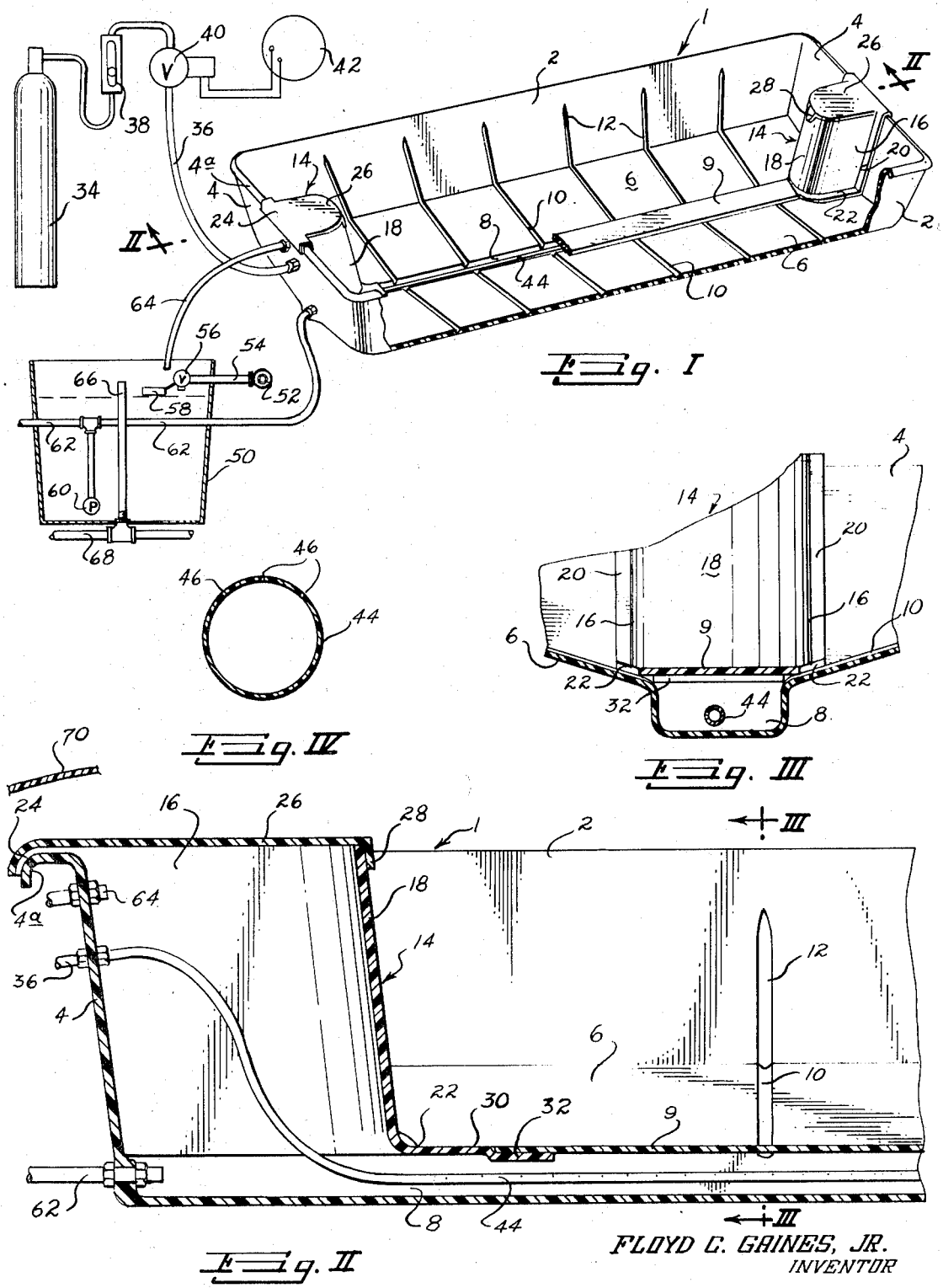
Dec. 29, 1970     F. C. GAINES, JR     3,550,319
APPARATUS AND METHOD FOR INJECTING PURIFIED GAS TO PLANT ROOTS
Filed May 31, 1968
FLOYD C. GAINES, JR.
INVENTOR
BY Howard E. Moore
ATTORNEY

3,550,319
APPARATUS AND METHOD FOR INJECTING PURIFIED GAS TO PLANT ROOTS
Floyd C. Gaines, Jr., Waxahachie, Tex., assignor to Pan American Hydroponics, Inc., Grapevine, Tex., a corporation of Texas
Filed May 31, 1968, Ser. No. 733,400
Int. Cl. A01g 7/02, 31/02; A01n 7/00
U.S. Cl. 47—38                                    7 Claims

ABSTRACT OF THE DISCLOSURE

Apparatus and method for injecting purified gas to the roots of plants grown hydroponically comprising a perforated tube connected to a source of purified gas disposed in a channel formed in the bottom of a hydroponic plant trough whereby the purified gas may be injected into contours connected with said channel for disbursing the purified gas into the aggregate supporting roots of the said plants.

BACKGROUND OF THE INVENTION

The details of the process of photosynthesis are still imperfectly known, however a common accepted theory is that carbon dioxide is reduced to carbon monoxide, which, uniting with the hydrogen of the water in the cell, produces formaldehyde, the latter forming various sugars through polymerization. It is known that carbon monoxide is required for plant growth.

It is also known that all living plant cells require oxygen for respiration. The oxygen is consumed in the oxidation of organic materials to carbon dioxide, water and energy. The energy is used in the metabolic processes of the plant and in growth. Cells soon die without an adequate supply of oxygen. Tops of plants are exposed to the atmosphere and aeration is no problem but the root system, not so exposed, frequently is injured by the lack of air.

There are many variations of the basic technique of growing plants without soil. The name of each is somewhat descriptive of the method used. Some of the better known are as follows: Water culture, sand culture, sub-irrigation culture, gravel culture, cinder culture and trough culture. All these techniques are loosely known as "hydroponics." The technique of growing vegetables hydroponically, which is proven to be the most practical, is properly known as subirrigation culture or gravel culture. Using this method, the trays or troughs of inert material, such as fiberglass, are filled with gravel and the plants are placed in this medium with the roots being flooded from below at intervals with a water solution containing salts of all elements known to be essential for proper plant growth. It is necessary that all these salts be placed in the solution in the proper proportions and that the total concentration of salts be carefully controlled as well as the pH and temperature of this solution.

One source of carbon dioxide for plants grown in soil is from the decaying organic matter in the soil. However, this source of carbon dioxide is not present where plants are grown hydroponically since the plants are grown without soil.

Heretofore the carbon dioxide content of the atmosphere within the greenhouse has been controlled in an effort to provide optimum conditions for plant growth. Controlling $CO_2$ content of the air inside the greenhouse is expensive and is usually accomplished by burning fuel such as natural gas or propane to supply the $CO_2$. The results of burning fuel to supply the $CO_2$ have been unfavorable because the sterilized condition of the greenhouse is disturbed since other gases besides $CO_2$ are released into the greenhouse. The atmosphere is also disturbed by ventilation and opening and closing of doors resulting in loss of the $CO_2$ from the atmosphere.

Carbon dioxide enrichment of the atmosphere has given the most spectacular yield increases of any growth factor heretofore discovered in the culture of greenhouse crops. Recent accomplishments are similar to those which occurred a century ago when the benefits of chemical fertilizer were first utilized for crop production. The most limiting factor in the growth of terrestrial plants is the carbon dioxide concentration in the atmosphere. This is particularly true for greenhouse crops since the enclosed atmosphere is often depleted of carbon dioxide far below that present in the outside air.

A now widespread use, and what appears to be the almost universal adoption of carbon dioxide enrichment in greenhouse crop culture is attributed to an unusual set of circumstances which have developed simultaneously. A remarkable increase in yield, improved quality and accelerated maturity in all flower and vegetable crops has been demonstrated. The economic returns exceed many times the investment in generating units required for carbon dioxide enrichment.

SUMMARY OF THE INVENTION

The present invention involves a novel method of injecting carbon dioxide, oxygen, hydrogen, nitrogen and other purified gases known to be beneficial to plant development into the root supporting media. A tomato plant four inches high has approximately 239 miles of root system. There is a great deal more surface area in the root system than in the leaf system through which beneficial gases may be absorbed.

Comparison of plants which have been grown in beds in which gases have been supplied adjacent the root system with plants grown in a carbon dioxide enriched atmosphere have shown increases in plant fruit, foliage and growth comparable to the increases realized between plants grown in a carbon dioxide enriched atmosphere and those grown in an atmosphere which was not carbon dioxide enriched. The net increase in fruit from plants grown in beds in which carbon dioxide gas was injected near the root system has been from 20% to 40% greater than those of plants grown in beds with carbon dioxide enriched atmosphere.

A primary object of the present invention is to supply gaseous plant food directly into soil or gravel surrounding the plant roots in a diffused state in carefully regulated quantities to create optimal concentration at the point most beneficial to the plant.

Another object of the prseent invention is to accelerate growth rates which will result in earlier maturity and a marked shortening of the production cycle.

A further object of the invention is to increase the drv matter content of the fruit.

A still further object of the present invention is to provide a method to compensate for inadequate light intensities by providing conditions whereby the plant may make maximum use of available light.

A still further object of the present invention is to provide a method for growing plants utilizing artificial light.

A still further object of the present invention is to establish the most beneficial balance of light, mineral nutrients, temperature, moisture and gaseous plant food.

A still further object of the present invention is to provide apparatus for supplying gaseous material to plants which does not require enrichment of the entire atmosphere inside the greenhouse.

A still further object of the present invention is to provide a method for supplying gaseous plant food without injection of injurious byproducts into the greenhouse.

Another object of the present invention is to provide apparatus for maintaining gaseous plant nutrients where it may be utilized by the plant unaffected by ventilation of the greenhouse.

Other objects and advantages of the invention will become apparent from the following detailed description taken in connection with the accompanying drawings and claims.

DESCRIPTION OF THE DRAWINGS

The accompanying drawings of a preferred embodiment of the present invention are provided so that the invention may be better and more fully understood, in which:

FIG. I is a diagrammatic view of the apparatus used in the present invention showing a hydroponic plant trough in perspective with parts broken away, FIG. II is a cross-sectional view taken substantially along lines II—II of FIG. I, FIG. III is a cross-sectional view taken along lines III—III of FIG. II.

FIG. IV is an enlarged cross-sectional view of a perforated tube used in the invention.

Numeral references are employed to indicate the various parts shown in the drawing and like numerals indicate like parts throughout the various figures of the drawing.

DESCRPTION OF A PREFERRED EMBODIMENT

Referring to FIG. I of the drawing numeral 1 generally designates a trough for use as a container for hydroponic plant beds. Trough 1, constructed of any suitable inert material such as fiberglass is a structure formed by upwardly extending side walls 2 joined by end sections 4 and upwardly slopping bottom sections 6. The channel 8 is formed in the lowermost part of trough 1 at the intersection of the bottom sections 6 providing a means for transporting fluid throughout the length of the trough 1. Lateral grooves 10 are formed in the bottom sections 6 and connect with grooves 12 in the side wall sections 2. Fluid may pass through channel 8 into lateral grooves 10 and 12 for delivery to gravel or other material which is placed in the trough 1 for a hydrophonic plant bed.

Channel 8 is bridged by a cover plate 9 to prevent obstruction of channel 8 by gravel or other material placed in trough 1 and to prevent gravel from obstructing emission of gas through perforations in diffuser tube 44 extending therealong as will be hereinafter explained. The cover plate 9 is shorter in length than channel 8. Retainers 14 are positioned at opposite ends of cover plate 9 and provide a means for gaining access to the ends of channel 8.

Each retainer 14 consists of upstanding sides 16 closed at one end by an arcuate surface 18 defining a U-shaped structure. The sides 16 of each retainer 14 lie in spaced apart relation with outturned stiffeners formed on the edges opposite the arcuate surface 18. Stiffener 20 is connected at one end with a stiffener 22 which extends along the bottom edge of the sides 16 and arcuate surface 18. Stiffener 20 has a rolled portion at the upper end thereof forming hangers 24 which conform to the curvature of the rolled edge 4a of end wall 4 of the trough 1. A lid 26 is pivotally attached to the upper portion of retainer 14 and forms a closure with the sides 16 and 18 of retainer 14. A latch 28 is provided for maintaining the lid 26 in a closed position.

Stiffener 22 has a protruding section 30 extending therefrom which has a downwardly extending guide 32 which fits into channel 8 for maintaining alignment between retainer 14 and channel 8.

A source of purified gas 34 is connected through line 36 to the trough 1. Suitable means for regulating the flow of gas through line 36 is provided, such as flow meter 38 for measuring the flow rate and a solenoid-operated valve 40. The solenoid-operated valve 40 is controlled by a timer 42 which may be preset to open and close the valve for predetermined periods of time thereby cycling the purified gas through the system at intervals required for establishing optimum conditions.

Line 36 is connected to a perforated diffuser tube 44 with perforations 46 therein. Tube 44 is longitudinally disposed in channel 8 and extends substantially the entire length thereof.

As best seen in FIG. I, water enriched with various mineral elements forming a nutrient solution prepared according to scientific formulas, having proper concentration of minerals, is used for flooding the hydroponic bed to deliver food to the plants at predetermined intervals. Some form of sump connection and drain system is desirable having a sump 50 forming a container for the nutrient solution. A water supply line 52 is connected to inlet 54 with a valve 56 for regulating the flow of water therethrough. Valve 56 is of conventional design with a float 58 for opening and closing the valve. A pump 60 is utilized for pumping water from the sump through feed lines 62 into the hydroponic plant beds. A return line 64 is positioned in the trough to prevent the trough from overflowing by returning water to the sump 50. An overflow pipe 66 is open at the upper end thereof and disposed below the top of sump 50 to prevent the sump from overflowing. The overflow line 66 is connected with a threaded portion of drain line 68.

The sump 50 may be drained by removing the overflow line from the drain line thereby connecting the drain line directly to the lower portion of the sump. The plant troughs 1 may be drained by disconnecting the feed lines from the pump and allowing the water to flow from the troughs under the force of gravity.

It should be noted that both feed lines 62 and perforated diffuser tube 44 are disposed in channel 8 to allow purified gas to be released into the hydroponic bed while it is flooded with nutrient solution or after inlet lines 62 have been disconnected from pump 60 draining the hydroponic bed.

Diffuser tube 44 has a substantial number of small perforation therein for maximum diffusion of the gas into the nutrient solution, thereby facilitating absorption of the gas into the solution.

OPERATION

Gravel or other inert material may be placed in the trough 1 to form a support for the root structure of plants which are transplanted into the hydroponic bed. Suitable means for supplying a nutrient solution for intermittently flooding and draining the trough 1 is shown in FIG. I.

As best seen in FIG. III, channel 8 formed in the bottom of trough 1, closed at the top by cover plate 9, forms a suitable enclosed receptacle for perforated diffuser tube 44. At a predetermined time the timer 42 actuates the solenoid-operated valve 40a, allowing purified gas to flow through line 36 to the perforated diffuser tube 44 through perforations 46 into the elongated receptable formed by channel 8. The gas then flows along lateral grooves 10 and 12 and is subsequently dispersed into the gravel or other material which is placed in the trough 1 forming the hydroponic plant bed. It will be noted that the gas is uniformly distributed throughout the bed and about the plant roots by virtue of the lateral grooves 10 and 12.

From the foregoing, it may be seen that I have developed apparatus for feeding gaseous plant food directly into soil or gravel surrounding plant roots in a diffused state in carefully regulated quantities. It should also be noted that the gaseous plant food may be injected when water enriched with plant nutrients is in the trough or after the water has been drained therefrom, whichever is deemed to be the more desirable depending upon the specific plant being grown.

This same method of passing gas through the gravel may be utilized prior to placing the plants into the gravel for sterilizing the bed. A suitable pressurized canister of fumigant such as methyl bromide with two percent chloropicrin may be connected to line 36 in lieu of the source of purified gas 34. The fumigant will flow through the system in exactly the same manner as other gas. An impervious cover 70, perferably polyethylene, must be placed over the beds and sealed around the edges prior to releasing the fumigant to contain the fumigant and prevent exposure of humans to its poisonous effects.

Container 34 may contain one gas or any mixture of gases which is the most beneficial to the particular crop.

While the specific details of the invention have been herein shown and described, changes and alterations may be resorted to without departing from the spirit and scope of the invention as defined in the appended claims.

Having described my invention, I claim:

1. Apparatus for injecting gaseous plant food to plant roots comprising: a trough; porous material in said trough; a hollow retainer member disposed at at least one end of the trough; a channel extending along the bottom of the trough communicating with said retainer member; a cover for said channel; a plurality of laterally extending grooves in the bottom of the trough communicating with said covered channel; a source of gas; a conduit between said source of gas and said channel; vent means for admitting gas from said conduit to the channel; and regulating means in the conduit for intermittently dispensing gas in predetermined amounts to the channel to release same in the porous material adjacent the plant roots.

2. The combination called for in claim 1 wherein the means for intermittently dispensing gas in predetermined amounts includes a valve and a timing mechanism which may be preset to actuate the valve intermittently.

3. The combination called for in claim 1 wherein the porous material in the trough is inert gravel.

4. The combination called for in claim 1 with the addition of a source of liquid plant food; and means communicating with the source of liquid plant food and the channel for dispensing liquid plant food into the channel extending along the bottom of the trough.

5. Apparatus for injecting gaseous plant food to plant roots comprising: a container; upwardly sloping bottom walls on the container; an enclosed channel formed along the bottom wall of the container; lateral grooves formed along the upwardly sloping bottom walls of the container communicating with the channel; a hollow retainer in the container communicating with the channel providing access to an end of the channel; closure means movably secured to the retainer; inert material in the container for supporting plant roots; a source of carbon dioxide; a tube extending from said source through the hollow retainer into the channel along the bottom of the container, said tube having passages formed therein through which carbon dioxide is released into the channel; valve means in said tube between the source of carbon dioxide and the container; and timing means to control the valve to cause carbon dioxide to be released in the channel and lateral grooves intermittently in regulated amounts.

6. The combination called for in claim 5 with the addition of spaced grooves formed along sides of the container, said grooves communicating with the lateral grooves which are formed along the upwardly sloping bottom walls.

7. Apparatus for sterilizing plant beds comprising: a trough; porous material in said trough; a hollow retainer member disposed at at least one end of the trough; a channel extending along the bottom of the trough communicating with said retainer member; a plurality of laterally extending grooves in the bottom of the trough communicating with said channel; a source of fumigant; a conduit between said source of fumigant and said channel; valve means in the conduit; vent means for admitting fumigant from said conduit to the channel to release same in the porous material; and an impervious cover over said trough having the edges thereof sealed to prevent escape of the fumigant.

References Cited
UNITED STATES PATENTS

| | | | |
|---|---|---|---|
| 2,747,331 | 5/1956 | Steiner | 47—1.2 |
| 2,803,091 | 8/1957 | Radford | 47—38 |
| 2,814,161 | 11/1957 | Hawkins | 47—38 |
| 3,029,558 | 4/1962 | Odenkirk | 47—1 |
| 3,068,616 | 12/1962 | Shibata et al. | 47—1 |
| 3,233,366 | 2/1966 | Nutile et al. | 47—1.2X |
| 3,274,730 | 9/1966 | Bose | 47—1 |
| 3,352,057 | 11/1967 | Ferrand | 47—1.2 |
| 3,365,840 | 1/1968 | Cooper | 47—1.2X |

ROBERT E. BAGWILL, Primary Examiner

U.S. Cl. X.R.

21—108; 43—125; 47—1.2